(12) United States Patent
Bashor et al.

(10) Patent No.: US 6,332,769 B1
(45) Date of Patent: Dec. 25, 2001

(54) UNIVERSAL DUNNAGE TRAY MOLD

(76) Inventors: Alan Bashor, 5310 Canterbury, Fairway, KS (US) 66205; Craig Valentine, 9354 E. 64th St., Raytown, MO (US) 64133

( * ) Notice: Subject to any disclaimer, the term of this patent is extended or adjusted under 35 U.S.C. 154(b) by 0 days.

(21) Appl. No.: 09/404,519

(22) Filed: Sep. 23, 1999

(Under 37 CFR 1.47)

(51) Int. Cl.7 ............................. B29C 51/20; B29C 51/36
(52) U.S. Cl. ........................ 425/388; 425/384; 249/155; 264/553
(58) Field of Search ..................... 425/384, 388, 425/183, 387.1; 249/155, 157, 158; 264/553

(56) References Cited

U.S. PATENT DOCUMENTS

| | | | |
|---|---|---|---|
| 3,058,153 | * 10/1962 | Busch | 425/253 |
| 3,960,471 | * 6/1976 | Medendrop | 425/388 |
| 4,009,981 | * 3/1977 | Rosen | 425/388 |
| 4,099,901 | * 7/1978 | Shuman | 425/388 |
| 4,235,579 | * 11/1980 | Kurz et al. | 425/387.1 |
| 4,740,342 | * 4/1988 | Menard et al. | 425/388 |
| 4,789,129 | * 12/1988 | Sisto | 249/155 |
| 4,792,112 | * 12/1988 | Corby et al. | 249/155 |
| 5,667,747 | * 9/1997 | Harding et al. | 425/384 |

* cited by examiner

Primary Examiner—Robert Davis
Assistant Examiner—Thu Khanh T. Nguyen
(74) Attorney, Agent, or Firm—Spencer Fane Britt & Browne LLP

(57) ABSTRACT

An adjustable mold is provided for vacuum assisted drawing of a thermoplastic material into the mold to form a dunnage tray, the mold being water cooled and allowing adjustment of the mold sides and surface topography to allow rapid and inexpensive user adjustment of the mold to from a variety of dunnage tray sizes and shapes as selected by a user.

13 Claims, 4 Drawing Sheets

UNIVERSAL DUNNAGE TRAY MOLD

BACKGROUND OF THE INVENTION

The present invention relates to molding thermoplastic devices, and in particular, to an adjustable mold which can be used to make variously sized and shaped thermoplastic objects.

In the course of shipping and handling small parts and other objects, it is often desirable that multiple parts be placed into a tray for convenient handling. These trays generally are referred to as "dunnage trays." They typically provide a molded depression which conforms to the shape of the part being handled or shipped. Using a dunnage tray, each part can be placed into its own shape-conforming depression in order to securely hold the part and to protect the part from jostling and damage during the shipment process. Typically dunnage trays are filled by the manufacturer of a small part, and then shipped to a second location where the part is withdrawn from the dunnage tray and used in a manufacturing application. Therefore, the dunnage tray serves not only as a reasonable protective packaging for the small part, but also serves as a transportation vehicle and storage compartment for the small part. Since dunnage trays are most efficiently maintained as a reusable item, it is necessary that they be constructed of a resilient material, and it is helpful if the material is also relatively lightweight so as not to add to shipping costs. In view of these requirements, thermoplastic material has developed as an ideal construction material for dunnage trays and a substantial amount of time and effort and expense is devoted to the designing of efficient dunnage trays which permit safe and secure housing for the parts to be shipped and which conform very closely to the shape of the particular part. Therefore, it will be appreciated that a dunnage tray of a standard shape is of little use to a wide variety of manufacturers. Rather, it is necessary that dunnage trays be specifically designed and produced to hold a particularly shaped part of a single manufacturer. Such individual design and construction of molds to produce dunnage trays is an expensive aspect of dunnage tray production. In the case where a manufacturer is producing a large volume of parts over a significant amount of time, the cost of the dunnage trays becomes an acceptable level of expense which can be amortized over a number of years. However, in the case of a small manufacturer or a limited production of a particular part, it is very difficult to justify the high expense of producing an individual mold for a production of a particular part which may not justify the expense of the dunnage tray over the long term.

Therefore, a need has long existed for a means for reducing the cost of production of dunnage trays by reducing the cost of producing a dunnage tray mold which is particularly suited to an individual part. In order to produce a dunnage tray mold which can be reconfigured easily and conveniently to different parts and different manufacturers, it is necessary that the dunnage tray mold be adaptable to change not only the length, width, and depth of the dunnage tray, but also, the shaping of the interior surface of the dunnage tray so that the interior surface of the tray can conform to whatever part is being shipped in the tray.

An additional problem presented by this art is the need for a vacuum to be applied by the mold form to draw the sheet of thermoplastic material into close contact with the mold to take on the shape presented by the mold. This requires that apertures be incorporated in the mold which allow an applied vacuum to be pulled against the plastic sheet. In the case of an adjustable mold, a substantial difficulty is presented as to how to provide sufficient vacuum ports for large size molds while eliminating those vacuum ports when they are not required for molding smaller pieces. In addition, a further difficulty is presented in that the vacuum must be communicated through the mold form in order to draw down the plastic sheet.

In view of the foregoing difficulties it will be appreciated that a substantial problem is presented in the industry of reducing the cost of production of dunnage trays by reducing molding costs while satisfying the very specific and particularized shape requirements of both the manufacturer and the manufacturer's particular part.

SUMMARY OF THE INVENTION

The above-identified problems are solved in the present invention which provides a mold for the creation of dunnage trays which permits rapid and inexpensive modification of the length, width, and height of the exterior dimensions of the dunnage tray and which allows the interior surface of the dunnage tray to be shaped to the particular specifications of a particular manufacturer's small part or other object which is to be transported in the dunnage tray. Therefore, it is an object of the present invention to provide a mold for a dunnage tray which can be varied in its overall dimensions of the length, width, and height of the outer perimeter of the dunnage tray and which can be used with conventional rotary and single station thermal forming equipment.

Another object of the present invention is to provide a dunnage tray which can easily and inexpensively have the interior surface of the dunnage tray shaped to conform to a particular manufacturer's part-shape or quantity of parts to be shipped in each tray.

Yet another object of the present invention is to provide a variably-sized mold for creation of dunnage trays which allows the application of vacuum to that portion of the mold which is being utilized to form the dunnage tray and without loss of vacuum from portions of the mold or mold frame which are not being utilized.

The foregoing and other objects are not intended in a limiting sense as will be readily evident upon a study of the following specification and accompanying drawings comprising a part thereof. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

DESCRIPTION OF THE PREFERRED EMBODIMENT

Figure 1:
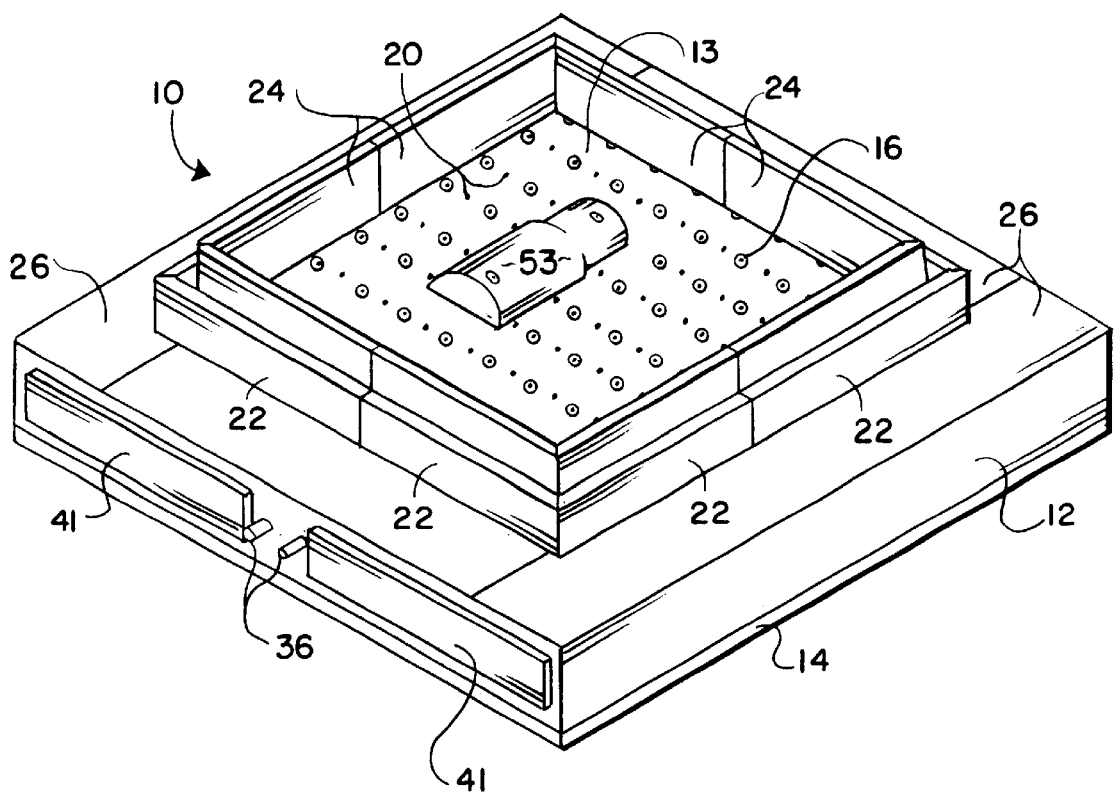
FIG. 1 is a perspective view of a preferred embodiment of the present invention having a mold piece placed thereon.

Referring now to FIG. 1, variable sized mold 10 is shown which is composed of base unit 12 and bottom plate 14. As will be described in detail hereinafter, base 12 permits the securing of fixtures to the top surface of base 12 through the use of lock-down voids 16. Base 12 also permits the transmission of reduced pressure or vacuum to the top surface 13 of base 12 by communication of the vacuum on reduced pressure through vacuum openings 20 on top surface 13 of base 12. Vacuum openings 20 are in communication with vacuum tubes 21 (FIG. 6) which are drilled completely through base 12 to allow the communication of vacuum between the bottom surface of base 12 and base top surface 13. In addition to communicating the reduced pressure or vacuum to top surface 13, base 12 also allows for the circulation of a coolant. The circulation of water or other coolant is accomplished by cooling water circulation tubes 38 (FIG. 2), which are drilled horizontally, through base 12 to allow water circulation through base 12 for cooling of the mold during the molding process. Water enters the circulation tubes 38 (FIG. 2) through water entry port 36 (FIG. 1). As will be described hereinafter, the water or other coolant is passed from one circulation tube to the next circulation tube by water flow director 41 which allows water to exit a first water circulation tube 38 (FIG. 2) from circulation tube end 39 (FIG. 2) and to enter an adjacent circulation tube 38.

The use of water or some other coolant to cool base 12 is particularly helpful during the molding process as a hot sheet of thermoplastic material is set on top of mold base 12. Once it is properly in place, the reduced pressure or vacuum drawn on mold 10 through the various vacuum openings 20 pulls the hot thermoplastic sheet (not shown) into the mold and conforms the plastic sheet to the final shape which is dictated by the configuration to which the mold has been adapted. Once the hot sheet of thermoplastic material has been pulled against the shape of the mold, it is then necessary to cool the sheet of plastic so that it retains the shape in which it has been formed. This is accomplished through the transfer of heat from the plastic sheet to base 12. The excess heat transferred to base 12 is drawn off by the circulating coolant within base 12. While it will be appreciated that base 12 could simply be allowed to cool by dispersal of heat to the surrounding air, this would not be practical in a commercial circumstance and would require excessive time between molding operations.

Figure 2:
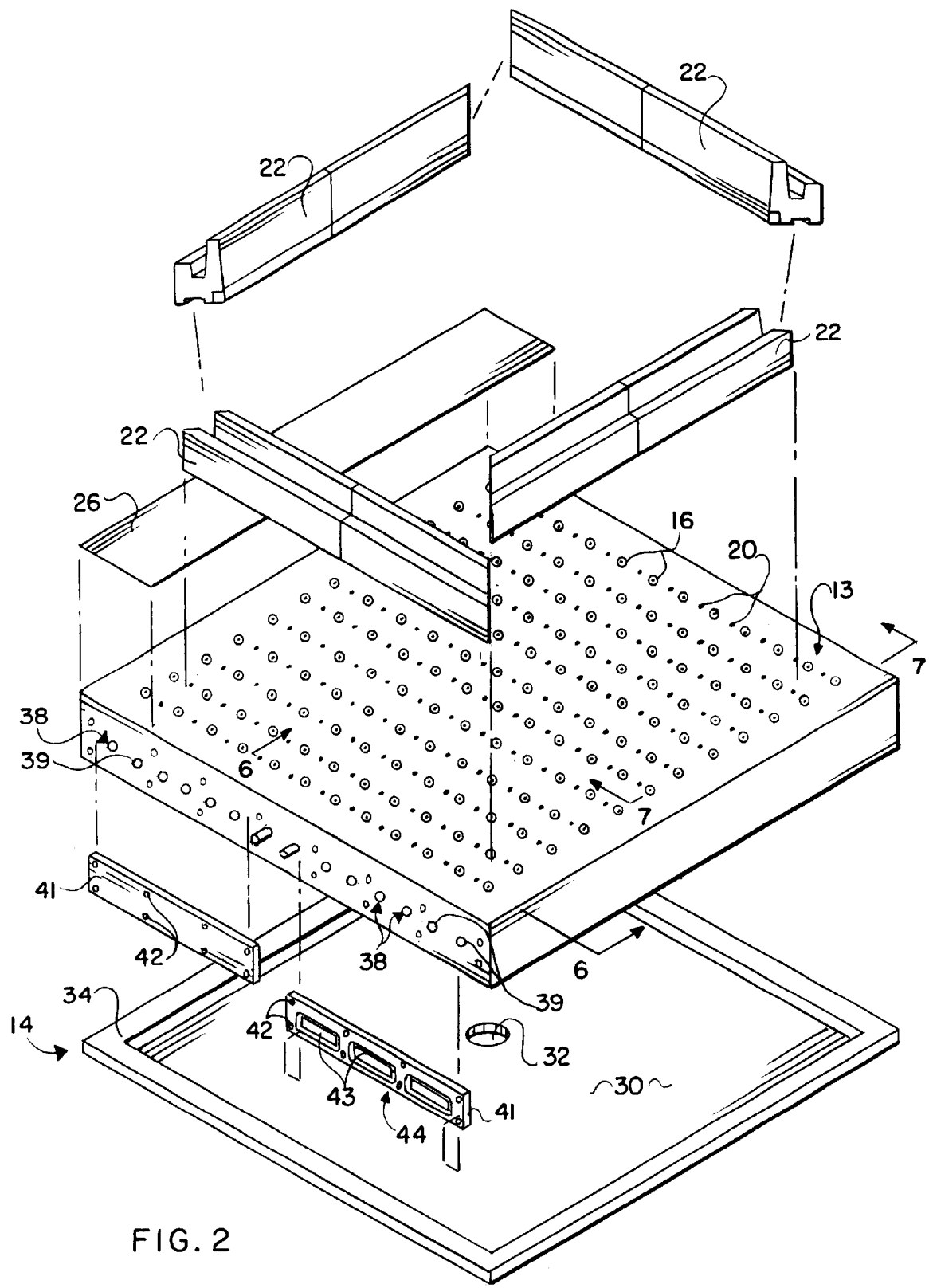
FIG. 2 is an exploded view of the embodiment shown in FIG. 1 and having the mold piece and three of the cover plates removed for clarity.

Referring now to FIG. 2, bottom plate 14, which is attached to base 12 of mold 10 in operation, is shown separated from base 12. Bottom plate 14 is a flat block of aluminum or other machinable material. Bottom plate 14 is provided with a vacuum entry port 32 which is in the center of a machined-out depression or vacuum chamber 30 in bottom plate 14. This depression provides a void of approximately one-eighth to one-quarter inch extending fully across the surface of bottom plate 14 and terminating in an outside rim 34 of bottom plate 14. Rim 34 provides a secure and air-tight connection of bottom plate 14 against the bottom surface of base 12. In this manner, a vacuum chamber 30 is provided on the bottom side of base 12 which allows the vacuum or low pressure which enters through vacuum connection port 32 to be spread across the entire bottom surface of base 12 and to be communicated to each of vacuum tubes 21 (FIG. 6) extending vertically through base 12. It will be appreciated that bottom plate 14 securely fastens to the bottom of base 12, and that use of a gasket on bottom plate rim 34 may assist in maintaining the low pressure or vacuum state created in vacuum chamber 30 of bottom plate 14 when mold 10 is in use.

Referring again to FIG. 1, additions to base 12 are shown which operate to reduce the exposed surface area of base top surface 13 when a mold dimension smaller than the full area of base top surface 13 is required. When it is desired to reduce the amount of exposed base top surface 13, such as when small dunnage trays are being molded, cover plates 26 are installed across portions of base top surface 13. Cover plates 26 are fastened in place by use of lock-down voids 16 which are machined into top surface 13 of base 12. To maintain the low pressure or vacuum which is used to operate mold 10, a gasket (not shown) is applied to the bottom surface of each of cover plates 26 to fully seal the covered area of top surface 13 and to reduce loss of vacuum in the unused portions of top surface 13 of base 12.

Figure 8:
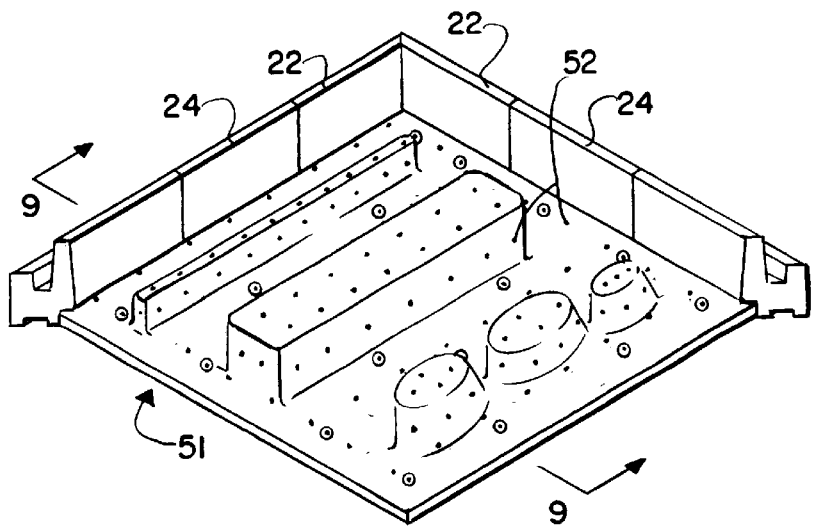
FIG. 8 is a perspective view of a mold plate and showing two side rails joined to the plate with the mold plate rim insert removed to allow connection of the mold plate to the side rails.

Referring again to FIG. 2, the assembly of the railing 22 and attachment of railing 22 to base 12 will be described. Railing 22 is a segment of a mold form which is attached to base 12 in order to create an outside rim for the molded object, in the case shown, a side of a dunnage tray. As can be seen in FIG. 1, a portion of the top surface of base 13 has been sealed using cover plates 26 to reduce the total area of top surface 13 of base 12. Just inside cover plates 26, rails 22 have been assembled and affixed to base 12 by insertion of a bolt through bolt void 61 (FIG. 3) of rail 22 of lock-down voids 16 in base 12. Rails 22 join together to form an outside perimeter for the mold piece. In the particular case shown in FIG. 1, the corner rail segments 22 have been joined together at their mitered corners to form each of the four corners of the outside perimeter of the rail. In FIG. 8, the area of the rail between corner segments 22 has been filled with extension rail units 24 to connect to the mitered corner rail units while extending the length of the railing. By use of extension rail units 24, a complete perimeter of any size up to the full perimeter of base 12 can be established on top surface 13. As the length of extension rails or rail extension segments 24 can be varied according to the size of the mold piece intended to be constructed, a mold perimeter of any size which can be fit onto top surface 13 of base 12 can be constructed in this fashion.

Figure 3:
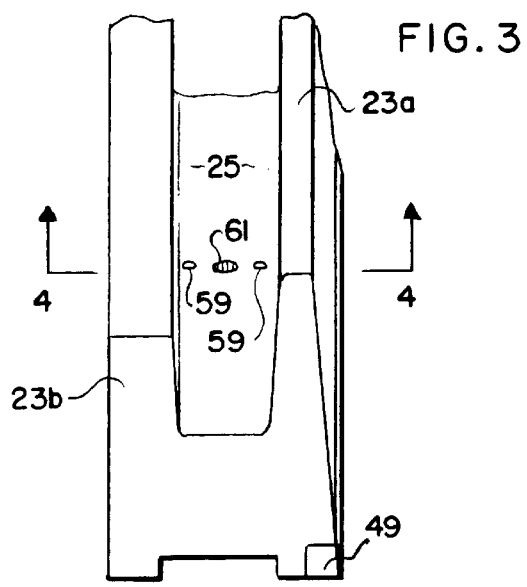
FIG. 3 is a fragmentary top and end perspective view of an embodiment of a rail of a preferred embodiment of the present invention.
Figure 4:
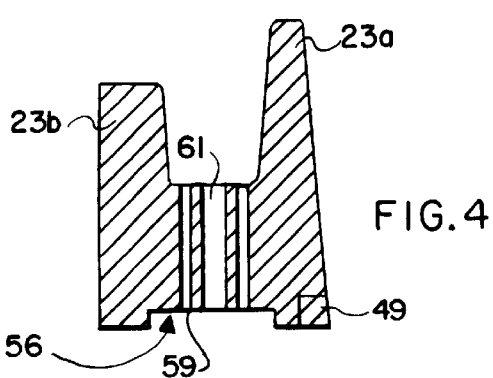
FIG. 4 is a cross-sectional view taken along line 4—4 of the rail shown in FIG. 3.
Figure 5:
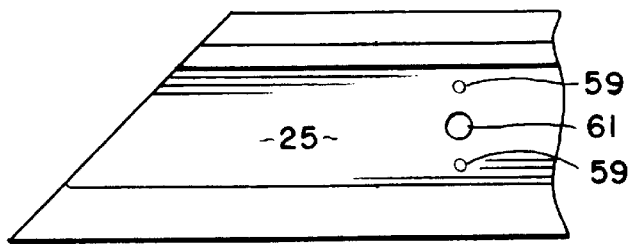
FIG. 5 is a top plan view of the rail shown in FIG. 3.

Referring now to FIGS. 3, 4 and 5, the construction of corner rail 22 and extension rail 24 will be discussed in greater detail. FIG. 3 shows a typical rail 22, 24 in fragmentary perspective view. Rail segment 22, 24 is provided with an inner side 23a and an outer side 23b. Trough 25 is provided between inner side 23a and outer side 23b which allows formation of an outer parameter lip of the molded piece. To draw the heated sheet of thermoplastic material down into trough 25 of rail segment 22,24, vacuum holes or ports 59 are provided in rail segments 22,24 to draw the thermoplastic material down and against rail segments 22,24. To securely fasten rail segments 22, 24 to base top surface 13, bolt voids 61 (FIG. 4) are provided in rail segments 22, 24 to permit fastening of the rail segments onto base 12. In FIG. 4, a cross-section view of rail 22, 24 shows the passage of vacuum ports 59 and bolt voids 61 through rail segments 22, 24.

Referring now to FIG. 4, a cross-sectional view of rail segment 22, 24 is shown. It will be appreciated that for vacuum ports 59 of rail segments 22, 24 to be effective, they must be in communication with the vacuum which is being applied to top surface 13 of base 12 (FIG. 1). The communication of vacuum to vacuum ports 59 of rail segments 22, 24 is accomplished by milling out of a depression or rail vacuum chamber 56 in the bottoms of segments 22, 24. Depression or rail vacuum chamber 56 allow communication of the vacuum from vacuum opening 20 (FIG. 2) in base top surface 13 to rail vacuum ports 59. Also shown in FIG. 4 is bolt void 61 for securing rail segments 22, 24 to lock-down voids 16 of base 12.

Referring again to FIG. 3B, additional aspects of rail segments 22, 24 will be discussed. It will be appreciated by those skilled in the art that for mold 10 to be effective, it is useful for mold insert pieces 53 (FIG. 1), or a mold plate 51 (FIG. 8), to be included in order to shape the otherwise flat top surface 13 (FIG. 1) of base 12 into a desired mold configuration. In the case of a dunnage tray, in particular, it is desirable to shape the top surface 13 of base 12 in order that depressions may be created in the plastic material molded by mold 10. It is useful that the final molded thermoplastic material have depressions therein which conform to the shape of a particular part or other object so that the part or object is securely held within the dunnage tray. This is accomplished by the attachment of a mold insert 53 (FIG. 1) to top surface 13 of base 12, or by the insertion of mold plate 51 (FIG. 8) across the top surface 13 of base 12.

When mold insert 53 (FIG. 1) is used, mold insert 53 may be directly attached to base top surface 13 by bolting mold insert 53 into lock-down voids 16 drilled into top surface 13 of base 12. Alternatively, it may be more efficient to cast an entire mold plate 51 (FIG. 8) to cover top surface 13 of base 12. Plate 51 is provided with a series of perforations or voids 52 to allow the communication of vacuum from vacuum openings 20 (FIG. 1) through mold plate 51 to draw a thermoplastic sheet against mold plate 51.

Figure 9:
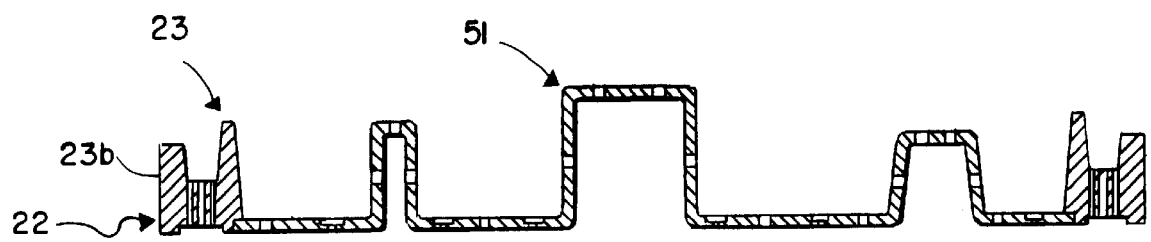
FIG. 9 is a cross-sectional view of the mold plate taken along line 9—9 of FIG. 8.

In FIG. 9, a vertical cross section of a rail segment 22 in connection with insert mold plate 51 is shown. To provide a tight-fitting connection between rail 22, 24 (FIG. 8) and mold plate 51 (FIG. 8), rail segments 22, 24 have been provided with a detachable mold plate rim insert 49 (FIG. 3) which can be released from rail segments 22, 24 to accommodate the insertion of the edge of mold plate 51. In this manner, as shown in FIG. 9, a tight fitting alignment between rail segments 22, 24 and insert plate 51 is provided. A gasket may be used therebetween to preserve the integrity of the vacuum being pulled on mold 10 which communicates through mold plate 51 and rail segment 22, 24 in order to draw the thermoplastic material down and into place.

Figure 6:
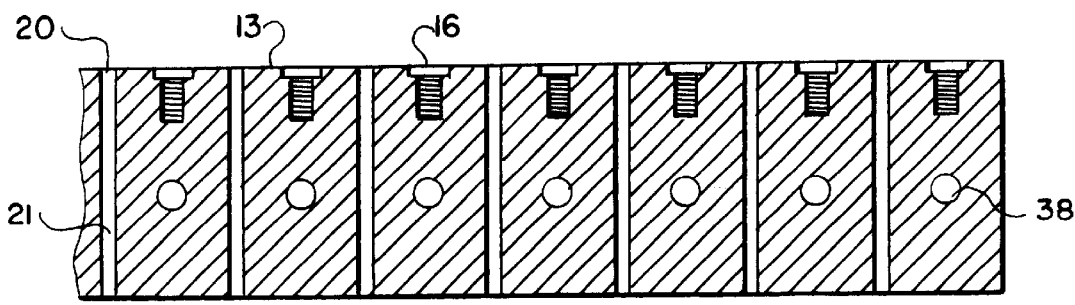
FIG. 6 is a fragmentary cross-sectional view taken along line 6—6 of FIG. 2.
Figure 7:
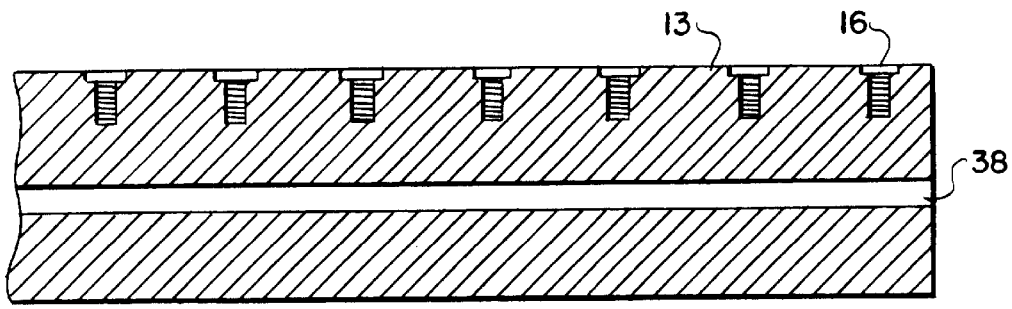
FIG. 7 is a fragmentary cross-sectional view taken along line 7—7 of FIG. 2.

Referring now to FIGS. 6 and 7, the alignment between cooling water circulation tubes 38 and lock-down voids 16 and vacuum openings 20 and vacuum tubes 21, all of which are contained within base 12, will be discussed. As is shown in FIG. 7, water circulation tubes 38 are drilled horizontally completely through base 12 and reach from side-to-side. It is also shown in FIG. 6 that vacuum tubes 21 are drilled vertically through base 12 to allow communication of vacuum from vacuum chamber 30 up through vacuum tubes 21 and to vacuum opening 20. Vacuum openings 20 in top surface 13 of base 12 are arranged in alternate rows with respect to lock-down voids 16. To accommodate all of these features within base 12, the arrangement is configured such that lock-down voids 16 are generally above cooling water circulation tubes 38. Since lock-down voids 16 extend only one or two inches vertically into base 12, they do not closely approach cooling water circulation tube 38. This vertical alignment between lock-down void 16 and cooling water circulation tubes 38 permits vacuum tubes 21 to be drilled in between water circulation tubes 38 thereby allowing vacuum tubes 21 to reach from top surface 13 of base 12 downwardly to vacuum chamber 30 without interfering with cooling water circulation tubes 38.

Referring now to FIG. 2, the manner in which water is transferred from one circulation tube 38 to an adjacent circulation tube 38 will be discussed. As previously described, water circulation tubes 38 are horizontally drilled completely across base 12. Water entering one side of a circulation tube 38 would simply drain out on the other side of water circulation 38 without the addition of a means for directing the water flow from one circulation tube 38 to an adjacent circulation tube 38. This directing of water flow is accomplished by water flow director 41 which is attached to the side of base 12 to cover circulation tube ends 39. Face 44 of water flow director 41 contacts the side of base 12. Face 44 is provided with milled-out depressions 43 which align with two adjacent circulation tube ends 39 when water flow director 41 is bolted to the side of base 12. Director bolt voids 42 are shown in FIG. 2 through which a bolt may be inserted to attach water flow director 41 to the side of base 12. When flow director 41 is in place, water will exit from a circulation tube end 39 and will be directed laterally by depression 43 of water flow director 41, and the water will then enter circulation tube end 39 of an adjacent water circulation tube 38. In this manner, water is allowed to enter water cool entry ports 36 (FIG. 1) and circulate throughout an entire set of adjacent cooling water circulation tubes 38 and finally exit from the end of the last circulation tube 38 on the side of base 12 that is opposite the side having entry ports 36.

In operation the use of the inventive mold is as follows. The user, attaches water flow directors 41 into place and connects a stream of coolant to entry ports 36. The user then arranges and attaches the proper molding parts onto top surface 13 of base 12. The arrangement of molding parts is, of course, necessary in order to provide a surface topography on top surface 13 to provide a molding form to shape a hot sheet of thermoplastic material as it is applied to variably sized mold 10.

The arrangement and attachment of molding parts is accomplished by selecting a mold insert 53 (FIG. 1) or a mold plate 51 (FIG. 8) for use on mold 10 and attaching the mold piece 53 or mold plate 51 to top surface 13. The attachment is accomplished, as previously described by inserting bolts through the mold piece 53 or mold plate 51 and securing the bolts in the available lock-down voids 16 machined into the top surface 13 of base 12. Once this is accomplished, a perimeter rail formed by rail segments 22, 24 may be established around the mold insert 53 or mold plate 51.

When rail segments 22, 24 are to be bolted to top surface 13, bolt void 61 is used to pass the bolt through rail segments 22, 24 to connect the bolt into bolt void 16 of top surface 13. This last secure contact of rail segments 22, 24 with top surface 13 and allows the transfer of the applied vacuum or reduced pressure through vacuum ports 59 of rail segments 22, 24 in order to draw the thermoplastic material down against rail segments 22, 24. When rail segments 22, 24 are applied around the perimeter of mold plate 51, it is first necessary that rim inserts 49 (FIG. 4) be removed from rail segments 22, 24 so that insertion of the edge of mold plate 51 closely against rail segments 22, 24 may be provided. In the case in which mold inserts 53 (FIG. 1) are utilized on top surface 13 of base 12, it is not necessary to remove rim inserts 49 from rail segments 22, 24 to preserve the integrity of the vacuum being pulled on mold 10.

When the position of rail segments 22,24, or other final mold plate or mold insert 53 has been attached to top surface 13, it is necessary to seal off any vacuum openings 20 which are outside the molding area. This is done to reduce the loss of vacuum that is being pulled on mold 10 during operation. This is simply accomplished by application of cover plates 26 (FIG. 1) across the unused portion of top surface 13 of base 12 in order to seal vacuum openings 20 which are not needed in order to pull a heated sheet of thermoplastic material against mold 10.

Once the mold plate or mold insert 53 and rail segments 22, 24 have been secured to top surface 13 of base 12, the mold 10 is prepared for use. The operator then applies the vacuum or reduced pressure to opening 32 of bottom plate 14 (FIG. 2) to provide vacuum to vacuum chamber 30 so that vacuum is distributed across the entirety of base 12 and communicated to vacuum tubes 21 which pass through base 12 to provide vacuum or reduced pressure to vacuum openings 21 and top surface 13 of base 12. The operator establishes the flow of coolant through openings 36 (FIG. 1) of base 12 in order to maintain mold 10 at proper operating temperature. Once this has been accomplished, mold 10 is now prepared to have heated thermoplastic sheets applied to the top of mold 10 so that the applied vacuum or reduced pressure to mold 10 may pull the heated thermoplastic sheet against mold plate 51 or mold insert 53 and rail segments 22, 24 in order to form the desired molded part on mold 10.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the improved dunnage tray mold is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. An apparatus for molding a plastic sheet to form a dunnage tray by applying a vacuum to the sheet, the apparatus having a coolant applied thereto to cool the apparatus, the apparatus comprising:

a base, said base having a work surface, sides and a bottom, at least two voids extending through said base to communicate the vacuum to said base work surface, at least one aperture in said base for distributing coolant through said base, a mold form for placement on said base work surface, said mold form covering at least a portion of said work surface, said mold form having openings therein for communication of the vacuum through said mold form to allow the vacuum to pull the plastic sheet against said mold form, and a frame for attachment to said work surface, said frame dividing said work surface into an operating portion enclosed by said frame and a non-operating portion exterior to said frame, said frame having a plurality of voids extending therethrough for communicating the vacuum from the work surface to a location on said frame suitable for allowing said vacuum to pull the plastic sheet against said frame to form an outside rim of the dunnage tray.

2. The apparatus as claimed in claim 1 further comprising means for sealing a portion of said vacuum communicating voids to communicate the vacuum to only the area of the work surface having said mold form thereon.

3. The apparatus as claimed in claim 1 wherein said mold form is a mold plate.

4. The apparatus as claimed in claim 1 wherein said mold form is a mold form for a single part.

5. The apparatus as claimed in claim 2 wherein said means is a cover plate for placement on said base work surface to seal unused portions of said base work surface from drawing the vacuum therethrough.

6. The apparatus as claimed in claim 1 wherein said aperture for distributing coolant through said base connects to a convoluted tube which distributes coolant throughout said base.

7. The apparatus as claimed in claim 6 wherein said tube is a plurality of connected passages drilled through said base.

8. The apparatus as claimed in claim 1 wherein said aperture for distributing coolant through said base connects to a series of coolant holding voids within said base.

9. The apparatus as claimed in claim 1 further comprising a plurality of securing voids in said base work surface for connecting a mold form thereto.

10. The apparatus as claimed in claim 1 further comprising a chamber connected to said base, said chamber having the vacuum applied thereto and said chamber operating to distribute the vacuum to a plurality of voids in said base to communicate the vacuum to said base work surface.

11. The apparatus as claimed in claim 2 wherein said means is a plug for insertion into one of said vacuum communication voids to block communication of vacuum through said void.

12. The apparatus as claimed in claim 1 further comprising extension pieces insertable within said frame to change the size of said tray rim.

13. An adjustable molding apparatus for producing variously sized dunnage trays for variously sized articles from a thermoplastic sheet, the apparatus having a coolant circulating therethrough and a vacuum applied thereto, said mold comprising:

a base, said base having a work surface, sides and a bottom, a vacuum chamber attached to said base, said chamber operating to distribute the vacuum applied thereto, a plurality of vacuum communicating voids extending through said base to communicate the vacuum from said chamber to said base work surface, a plurality of apertures in said base for distributing the coolant through said base, securing ports in said work surface for attachment of mold forms to said work surface, a frame for attachment to said work surface, said frame dividing said work surface into an operating portion enclosed by said frame and a non-operating portion exterior to said frame, said frame having a plurality of voids extending therethrough for communicating the vacuum from the work surface to a location on said frame suitable for allowing said vacuum to pull the plastic sheet against said frame to form an outside rim of the dunnage tray, cover plates for attachment to said work surface non-operating portion, said cover plates operating to prevent vacuum loss by said voids located on said non-operating work surface, and a mold form for attachment to said securing ports on said base work surface, said mold form having voids therein to communicate the vacuum from said base vacuum voids to the plastic work piece to draw the plastic against the mold form to form a receptacle in the dunnage tray for placement of a part therein.

* * * * *